United States Patent

Verhoog et al.

[11] Patent Number: 5,948,560
[45] Date of Patent: Sep. 7, 1999

[54] SEALED FEED-THROUGH DEVICE FOR AN INSULATIVE PARTITION WALL BETWEEN TWO ELECTRODE ASSEMBLIES OF A STORAGE BATTERY

[75] Inventors: Roelof Verhoog; Alain Genton, both of Bordeaux; Jean-Loup Barbotin, Pompignac, all of France

[73] Assignee: Alcatel, Paris, France

[21] Appl. No.: 09/031,764

[22] Filed: Feb. 27, 1998

[30] Foreign Application Priority Data

Mar. 3, 1997 [FR] France .................................. 97 02493

[51] Int. Cl.$^6$ ...................................................... H01M 2/24
[52] U.S. Cl. ............................................. 429/160; 429/185
[58] Field of Search ..................................... 429/160, 149, 429/123, 158, 185, 181, 174; 439/883, 277, 737

[56] References Cited

U.S. PATENT DOCUMENTS

| 2,906,804 | 9/1959 | Rigsby, Sr. . | |
| 4,480,018 | 10/1984 | De Bellis et al. | 429/160 |
| 4,668,037 | 5/1987 | Jouanny | 439/277 |

FOREIGN PATENT DOCUMENTS

| 0111643A1 | 6/1984 | European Pat. Off. . |
| 2419908 | 8/1975 | Germany . |
| 3644785 A1 | 7/1988 | Germany . |

*Primary Examiner*—Maria Nuzzolillo
*Assistant Examiner*—Susy Tsang
*Attorney, Agent, or Firm*—Sughrue, Mion, Zinn, Macpeak & Seas, PLLC

[57] ABSTRACT

A sealed feed-through device for an insulative partition wall between two electrode assemblies of a storage battery comprises a first connecting member connected to ends of assembled plate heads of the same polarity of a first assembly and a second connecting member connected to ends of assembled plate heads of the same opposite polarity of a second assembly separated from the first assembly by the insulative wall. One connecting member includes a blind hole having an axis perpendicular to the wall and an open end facing the wall. A seal coaxial with the blind hole is pressed against the wall and housed in a groove in the connecting member. The other connecting member includes a bore through hole coaxial with and having the same cross section as the blind hole. The two connecting members press one against the other through a hole in the wall without either member penetrating into the hole in the wall to a depth exceeding the thickness of the wall. An assembly member is forcibly inserted into the bore and the blind hole.

3 Claims, 2 Drawing Sheets

SEALED FEED-THROUGH DEVICE FOR AN INSULATIVE PARTITION WALL BETWEEN TWO ELECTRODE ASSEMBLIES OF A STORAGE BATTERY

BACKGROUND OF THE INVENTION

1. Field of the Invention

The present invention concerns a sealed feed-through device for an insulative partition wall between two electrode assemblies of a storage battery.

2. Description of the Prior Art

In a battery comprising a plurality of cells connected in series separated from each other by an insulative partition wall and disposed in a casing filled with an electrolyte connections must be made between the cells to connect them in series.

Each cell, referred to as an electrode assembly hereinafter, comprises a plurality of juxtaposed alternately positive and negative electrode plates separated by a separator. Each electrode plate has a plate head for making the electrical connections. All the plate heads of the same polarity of an electrode assembly are joined to a first connecting member and likewise all the plate heads of the opposite polarity of the adjoining assembly are joined to a second connecting member, these two members constituting an electrical connection device that has to pass through and be sealed to the partition wall between the two contiguous assemblies.

Document EP 0 111 643 describes a device of the above kind in which the first connecting member is a male member and the second member is a female member, the two members being a force fit one within the other and bearing one against the other so as not to crush the plastics material wall, the seal being provided by one or two seals.

This insertion of one of the members into the other implies transverse traction on the plate heads making it necessary to increase the space available above the assembly to increase the height of the plate heads to minimize the transverse traction force at this time.

The invention proposes another feed-through device reducing the height of the battery and avoiding the need for any traction force between plate heads and the active material.

SUMMARY OF THE INVENTION

The invention consists in a sealed feed-through device for an insulative partition wall between two electrode assemblies of a storage battery, comprising a first connecting member connected to ends of assembled plate heads of the same polarity of a first assembly and a second connecting member connected to ends of assembled plate heads of the same opposite polarity of a second assembly separated from the first assembly by the insulative wall, wherein one connecting member includes a blind hole having an axis perpendicular to the wall and an open end facing the wall, a seal coaxial with the blind hole and adapted to be pressed against the wall is housed in a groove in the aforementioned one connecting member, the other connecting member has a bore through hole coaxial with and having the same cross section as the blind hole, the two connecting members are adapted to press one against the other through a hole in the wall without either member penetrating into the hole in the wall to a depth exceeding the thickness of the wall and an assembly member is forcibly inserted into the bore and the blind hole.

In accordance with another feature, one connecting member has on the side facing the wall a self-piercing cone penetrating the wall to a depth corresponding to the wall's thickness and adapted to be pressed against the face of the other connecting member pressed against the wall.

The advantage of this feature is that it avoids the need to provide a hole in the insulative wall and therefore the need to align the two connecting members accurately with the hole.

It is advantageously the connecting member with the blind hole that carries the self-piercing cone.

One embodiment of the invention will now be described with reference to the appended drawings.

DETAILED DESCRIPTION OF THE PREFERRED EMBODIMENTS

Figure 1:
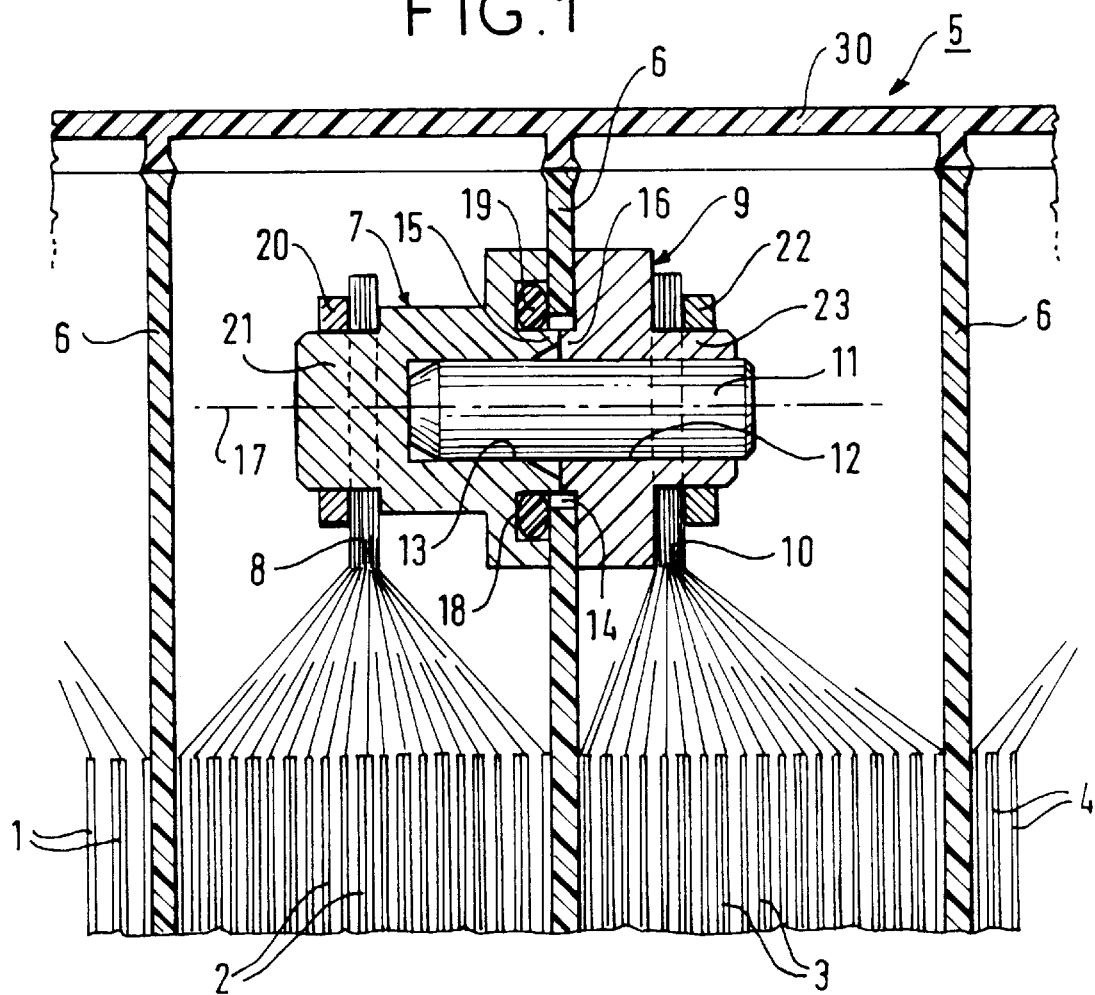
FIG. 1 is a partial view in section of a storage battery showing a device in accordance with the invention.

FIG. 1 shows part of a storage battery such as an alkaline battery, for example, containing a plurality of electrode assemblies 1, 2, 3, 4 in a monobloc plastics material casing 5. The assemblies are separated from each other by an insulative partition wall 6.

Each assembly constitutes a cell comprising an assembly of alternately positive and negative plates separated from each other by a separator.

The various assemblies are electrically connected in series which means that it is necessary to make electrical connections through the various insulative walls 6. The figure shows only one such feed-through device. It connects the positive plates of the assembly 2 to the negative plates of the assembly 3 (or vice versa).

The device comprises a first connecting member 7 connected to the end 8 of the assembled positive plate heads of the assembly 2, a second connecting member 9 connected to the end 10 of the assembled negative plate heads of the assembly 3 and an assembly member 11 force-fitted into a bore 12 through the second connecting member 9 and into a blind hole 13 in the first connecting member 7 coaxial with and having the same section as the bore 12. Bearing surfaces IS, 16 of the two connecting members 7 and 9 bear one against the other through a hole 14 in the insulative wall 6 so that the insulative wall 6 is not crushed between the peripheral portions of the connecting members 7 and 9. The connecting members 7 and 9 are circular and their common axis 17 is perpendicular to the insulative wall 6. The first connecting member 7 has a circular groove 18 coaxial with the blind hole 13 fitted with a seal 19 pressed against the insulative wall 6.

In the example shown the bearing surfaces 15, 16 of the two connecting members when pressed one against the other each penetrate the hole in the wall 6 to only half the thickness of the wall 6 so that, when the assemblies are inserted into the casing 5 (before the casing is closed by the lid 30) only a small rotation of the plate heads and their connecting parts 7 and 9 is required, followed by rotation in the opposite direction, for them to come into contact one with the other through the hole 14, assembly being effected thereafter only with the forcible insertion of the assembly member 11. There is therefore no longer any traction on the plate heads necessitated by the relatively large displacement in the prior art in which the assembly is effected directly by the two connecting members having male and female portions. This absence of traction enables the free height above the plates to be reduced.

In this figure the assembled plate heads 8 are connected to the first connecting member 7 by means of a ring 20 force-fitted onto a portion 21 of the connecting member passing through a hole in the assembled plate heads 8. Likewise the second connecting member 9: a ring 22 is force-fitted onto a portion 23 of the connecting member 9 passing through a hole in the assembled plate heads 10.

Figure 2:
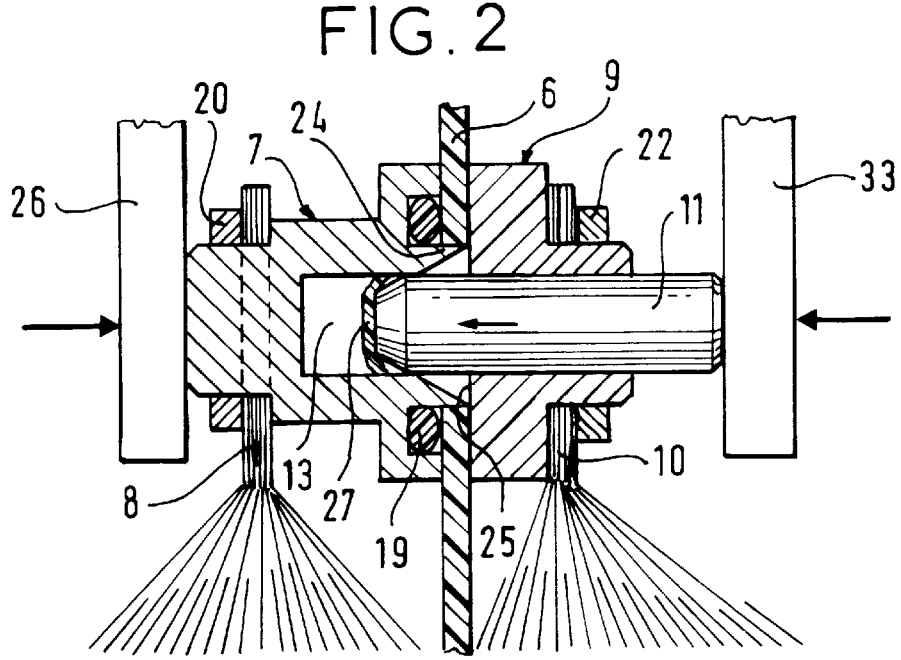
FIG. 2 shows a variant of the device during assembly.

FIG. 2 shows a variant in which the first connecting member 7 includes a self-piercing cone 24. The second connecting member 9 has a plane bearing face 25 pressed against the wall 6.

In this case the wall does not comprise any hole 14 beforehand, as in FIG. 1.

During assembly the assembly part 11 is struck to insert it into the members 7 and 9, for example by means of a bearing member 33 and a backing member 26, and the cone 24 cuts a disk 27 out of the wall 6 which is entrained towards the back of the blind hole 13 by the assembly member 11.

Figure 3:
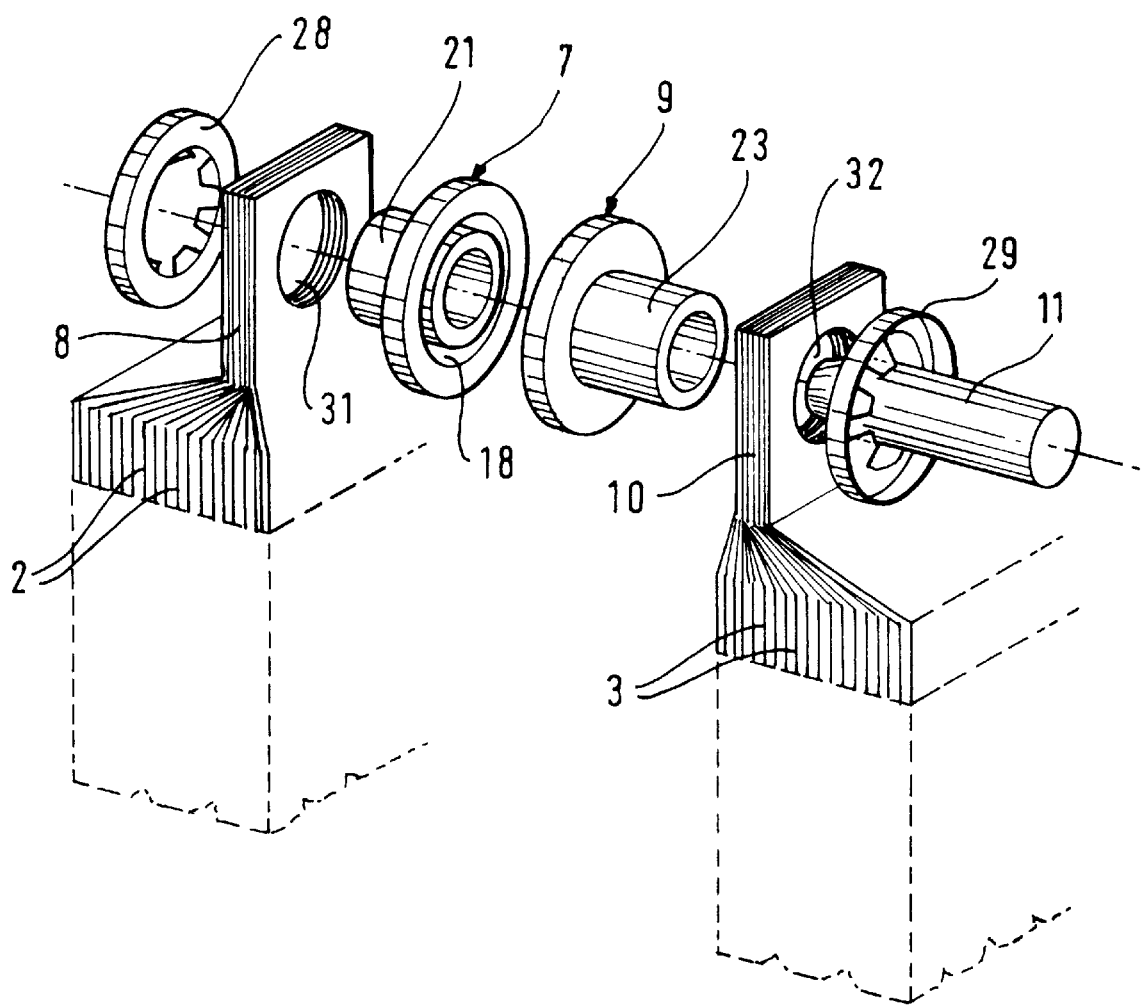
FIG. 3 is a perspective view of one possible means of fixing the connecting members to the plate heads.

This variant avoids the need to center the two connecting members 7 and 9 accurately on the axis of a pre-existing hole. FIG. 3 gives one example, selected from a very large number of possibilities, of a mode of connecting the connecting members 7 and 9 to the assembled plate heads 8 and 10. In FIG. 1 this is effected by means of force-fitted rings 20, 22. In FIG. 3 disks 28, 29 with claws are wedged onto the portions 21 and 23 of the members 7 and 9 after they are passed through holes 31 and 32 in the assembled plate heads 8 and 10.

The connection can equally well be made by welding.

There is claimed:

1. A sealed feed-through device for an insulative partition wall between two electrode assemblies of a storage battery, comprising a first connecting member connected to ends of assembled plate heads of the same polarity of a first assembly and a second connecting member connected to ends of assembled plate heads of the same opposite polarity of a second assembly separated from said first assembly by said insulative wall, wherein one connecting member includes a blind hole having an axis perpendicular to said wall and an open end facing said wall, a seal coaxial with said blind hole and adapted to be pressed against said wall is housed in a groove in said one connecting member, the other connecting member has a bore through hole coaxial with and having the same cross section as said blind hole, said two connecting members are adapted to press one against the other through a hole in said wall without either member penetrating into said hole in said wall to a depth exceeding the thickness of said wall and an assembly member is forcibly inserted into said bore and said blind hole.

2. The device claimed in claim 1 wherein one of said connecting members has on the side facing said wall a self-piercing cone penetrating said wall to a depth corresponding to the wall's thickness and adapted to be pressed against the face of the other connecting member pressed against said wall.

3. The device claimed in claim 2 wherein said self-piercing cone is carried by said connecting member including said blind hole.

* * * * *